United States Patent [19]

Lee

[11] 4,118,961
[45] Oct. 10, 1978

[54] PROTECTIVE GUARD FOR AN IGNITION SWITCH ON A STEERING COLUMN OF A MOTOR VEHICLE

[76] Inventor: James D. Lee, 5360 Kensington Rd., Brighton, Mich. 48116

[21] Appl. No.: 788,319

[22] Filed: Apr. 18, 1977

[51] Int. Cl.² .................................... E05B 17/14
[52] U.S. Cl. ................................. 70/237; 70/18; 70/424; 70/428
[58] Field of Search ............... 70/428, 424, 211, 237, 70/18, 49, 417, 426, 14, 19, 30, 164, 178; 248/231

[56] References Cited

U.S. PATENT DOCUMENTS

| 1,530,814 | 3/1925 | Credle | 70/178 |
|---|---|---|---|
| 1,737,151 | 11/1929 | Derbyshire | 248/231 X |
| 1,921,434 | 8/1933 | Stone | 70/18 X |
| 3,735,714 | 5/1973 | Shoop | 70/417 X |
| 3,756,008 | 9/1973 | Smith | 70/18 X |
| 3,765,197 | 10/1973 | Foote | 70/49 X |
| 3,808,847 | 5/1974 | Vesely | 70/18 |
| 3,811,303 | 5/1974 | Robertson | 70/18 X |
| 3,916,658 | 11/1975 | Barry | 70/417 |
| 3,948,069 | 4/1976 | Imbriano | 70/428 |
| 3,990,276 | 11/1976 | Shontz | 70/49 X |
| 4,008,589 | 2/1977 | Harrell | 70/237 X |
| 4,020,662 | 5/1977 | Fowler | 70/237 |

Primary Examiner—Rodney H. Bonck
Attorney, Agent, or Firm—Barnes, Kisselle, Raisch & Choate

[57] ABSTRACT

A steering column ignition switch protective guard having a cup member overlying and surrounding the ignition switch and a pair of flexible metal strap members each fixed adjacent one end to the cup, extending in an opposite direction around the steering column and each having an eye adjacent the other end through which the shackle of a padlock extends to retain and lock the protective guard on the steering column.

18 Claims, 7 Drawing Figures

PROTECTIVE GUARD FOR AN IGNITION SWITCH ON A STEERING COLUMN OF A MOTOR VEHICLE

This invention relates to devices for preventing the theft of motor vehicles such as automobiles and more particularly to a protective guard preventing unauthorized access to an ignition switch on a steering column of a motor vehicle such as an automobile.

Most modern automobiles are equipped with an ignition switch on the steering column which when locked, also locks the steering wheel and the transmission shift lever of the vehicle thereby preventing unauthorized operation of the motor vehicle even if the engine is started without turning on the ignition switch such as by so called hot wiring or jumpering of the ignition switch. Thus, thieves of motor vehicles have developed satisfactory tools and methods for rapidly engaging and pulling out of the steering column such an ignition switch, thereby unlocking the steering wheel and shift lever so that the vehicle can be steered and driven away under its own power.

Protective guards for preventing unauthorized access to steering column ignition switches have been previously developed and one such protective guard is shown in U.S. Pat. No. 3,811,303 issued May 31, 1974. This protective guard has two pivotally connected complimentary metal housing portions which can be positioned around the steering column and when locked together, completely enclose and encase the ignition switch to prevent unauthorized access to the ignition switch.

Objects of this invention are to provide a protective guard which is comparatively compact, lightweight, and easily and quickly mounted on and removed from the steering column, can be readily manufactured for use on different diameter steering columns, does nor mar or scratch the surface of steering columns when utilized thereon, and is of simple design and economical construction, manufacture, and assembly.

These and other objects, features, and advantages of this invention will be apparent from the appended claims, following detailed description, and accompanying drawings in which:

Figure 1:
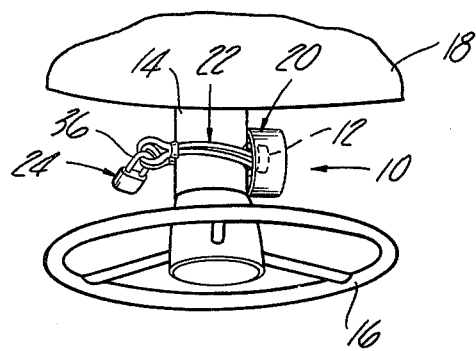
FIG. 1 is a fragmentary perspective view of a conventional steering column, ignition switch, and dashboard of an automobile with a protective guard embodying this invention positioned around the steering column and ignition switch to prevent unauthorized access to the ignition switch.

Referring in more detail to the drawings, FIG. 1 illustrates a protective guard 10 embodying this invention and enclosing and positioned around a conventional ignition switch 12 on a steering column 14 with a steering wheel 16 thereon and extending from a dashboard 18 of an automobile (not shown). Protective guard 10 has a metal housing 20 encircling and overlying ignition switch 12 and a pair of flexible metal bands 22 extending from the housing around the steering column with a conventional padlock 24 extending through their free ends to retain and lock the protective guard on the steering column.

Figure 4:
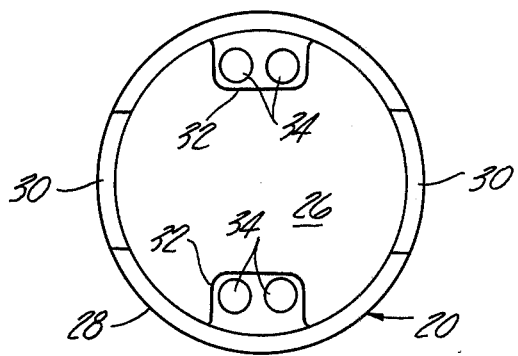
FIG. 4 is an end view of the housing of the protective guard of FIG. 1.
Figure 2:
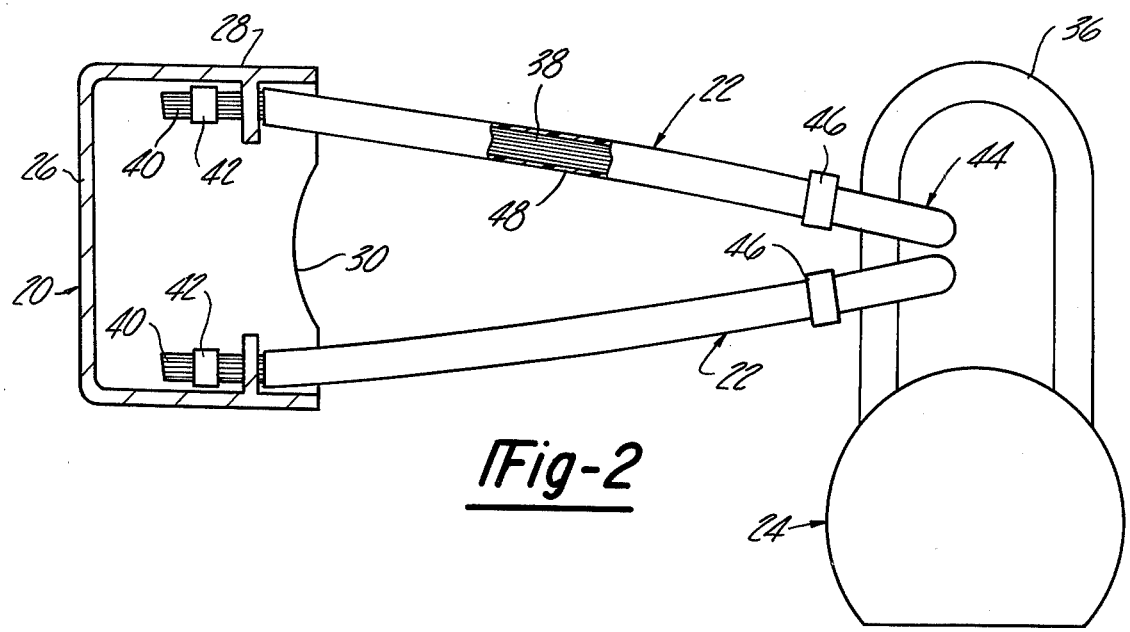
FIGS. 2 and 3 are side and top views respectively with portions broken away of the protective guard of FIG. 1.
Figure 3:
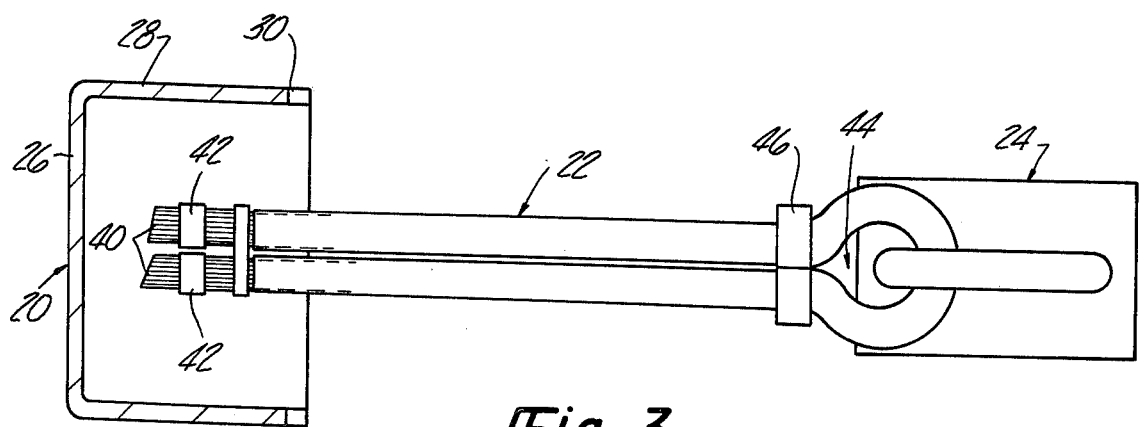

As shown in FIGS. 2, 3 and 4, housing 20 is a one-piece metal cup having a generally flat bottom wall 26 and an integral generally circular side wall 28 with a pair of generally diametrically opposed arcuate recesses 30 in the free end of the side wall which generally conform to the contour of the steering column and preferably provide a slight clearance between the housing and the steering column when the protective guard is mounted on the steering column. A pair of anchor plates 32 each with two holes 34 therethrough are positioned in generally diametrically opposed relation within housing 20 at generally a right angle to the diametrically opposed arcuate recesses 30 and are permanently fixed to the interior of side wall 28.

As shown in FIGS. 1, 2 and 3 and in accordance with one feature of this invention, housing 20 is positioned on steering column 14 by flexible metal straps 22 which readily conform to the contour of the steering column and receive the clevis 36 of conventional padlock 24. Each metal strap 22 is preferably a loop of flexible steel cable 38 the free ends 40 of which are secured to housing 20 within the housing. Each cable 38 is secured to housing 20 by extending each free end 40 through a hole 34 in anchor plate 32 and securing a retainer ring 42 to the cable between the anchor plate and the end thereof such as by crimping the ring to the cable. The bight at the other end of each loop of cable 38 provides an eye 44 through which the clevis 36 of padlock 24 extends. The eye 44 is preferably closed by binding the two strands of each loop of cable 38 together adjacent the bight end by split binding rings 46 which are crimped around both strands of each loop of cable. To prevent cables 38 from scratching or marring the exterior surface of steering column 14, at least the portion of each cable extending beyond housing 20 and likely to come in contact with the steering column is encased in a suitable flexible rubber or plastic material 48 such as vinyl or nylon.

While flexible straps 22 are preferably a metal cable, they can also be a loop of chain with metal links or even a single strand of chain with metal links preferably large enough so that the last link at the free end of each strand would provide a closed eye for receiving the shackle 36 of padlock 24. Preferably each link of the chain would be coated with a suitable plastic material to prevent marring of the steering column. Protective guard 20 can be readily produced for use on different size steering columns by simply varying the length of flexible straps 22.

Preferably both the housing 20 and the flexible straps 22 are each made of a metal such as stainless steel so that the protective guard cannot readily be forceably removed from a steering column by unauthorized persons. Housing 20 including anchor plates 32 can be cast in one piece of stainless steel and flexible straps 22 with stainless steel cables 38 readily secured thereto and provided with closed eyes by crimping to the cables retainer rings 42 and binding rings 46 of brass. Preferably both cables 38 and rings 46 are encased in a flexible plastic material to prevent marring and scratching of a steering column.

Figure 5:
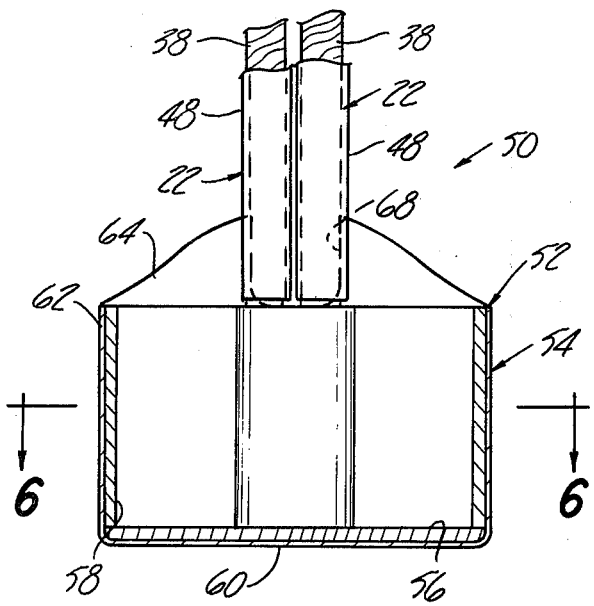
FIG. 5 is a fragmentary side view in section of another protective guard embodying this invention.
Figure 6:
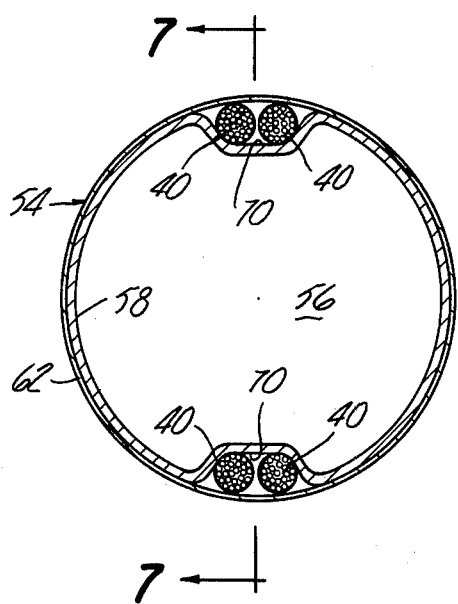
FIG. 6 is a sectional view on line 6—6 of FIG. 5.
Figure 7:
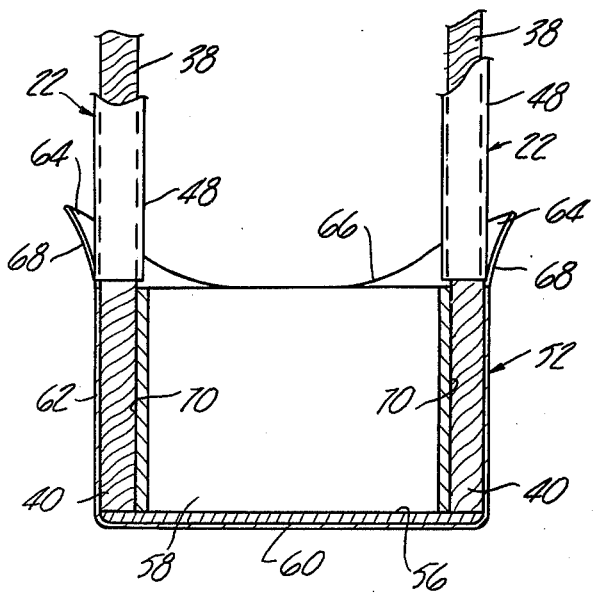
FIG. 7 is a sectional view taken generally on line 7—7 of FIG. 6.

FIGS. 5–7 illustrate another protective guard 50 embodying this invention and having a housing 52 with a pair of metal straps 22 extending therefrom. Housing 52 has a one piece metal cup 54 with a backing disk 56 and a reinforcing ring 58 received therein. Cup 54 has a generally flat bottom wall 60 and an integral generally circular side wall 62 which terminates in two diametrically opposed and flared lips 64 with a pair of generally diametrically opposed arcuate recesses 66 between the lips. Recesses 66 generally conform to the contour of steering column 14 and preferably provide a slight clearance between housing 52 and the steering column when protective guard 50 is mounted thereon. To provide clearance between straps 22 and lip portions 64 when protective guard 50 is mounted on a steering column, each lip portion has a generally U shaped slot 68 therein.

Reinforcing ring 58 is preferably continuous and has a pair of diametrically opposed recesses 70 formed therein and each receiving and having fixed therein such as be welds both ends 40 of a cable 38 of one of the straps 22. In assemblying housing 52, backing disk 56 is placed in the bottom of cup 54 and then reinforcing ring 58 with straps 22 fixed thereto is preferably press fit into cup 54 thereby securing the straps and the cup together and retaining disk 58 in firm engagement with bottom wall 60 of the cup. In the completed assembly, backing disk 56 and ring 58 provide reinforcement of the bottom wall 60 and side wall 62 of the cup 54. If desired, reinforcing ring 58 can be welded to cup 54 either in lieu of or in addition to a press fit of the ring within the cup.

The protective guard 50 is the presently preferred embodiment of this invention for mass production because the various parts of housing 52 can be economically produced by stamping and metal forming operations and readily assembled. Preferably cup 54 and cables 38 are made of a metal such as stainless steel and backing disk 56 and reinforcing ring 58 are made of a less expensive metal such as plain carbon steel thereby providing a protective guard at minimal cost which cannot readily be forceably removed from the steering column by unauthorized persons.

Protective guards embodying this invention in comparison to previously known protective guards are lightweight, compact, and can be readily and quickly mounted on and removed from a steering column. Protective guards embodying this invention are also of simple design, can be easily produced to accommodate different diameter steering columns, readily conform to the contours of various steering columns, do not mar or scratch the steering columns on which they are utilized, and are of economical manufacture and assembly.

I claim:

1. A protective guard for an ignition switch on a steering column of a motor vehicle comprising, a metallic one-piece generally cup shaped housing member having an end wall and a side wall and constructed and arranged to overlie and surround the ignition switch when the protective guard is mounted on the steering column, a metallic ring received in said cup shaped member and constructed and arranged to reinforce said side wall of said cup shaped member, and first and second loops of flexible metallic cable each having both of its ends received in said cup shaped housing member and secured to said ring and its bite constructed and arranged to provide an eye for receiving the shackle of a padlock therethrough, said flexible loops being constructed and arranged to extend in generally opposite directions around the steering column closely adjacent thereto when said housing member overlies and encircles the ignition switch and to receive the shackle of a padlock through said eyes of said loops such that when the padlock is locked the protective guard prevents unauthorized access to the ignition switch.

2. The protective guard of claim 1 which also comprises a backing plate received in said cup-shaped member and constructed and arranged to reinforce said end wall, and wherein said ring retains said backing plate within said cup-shaped member.

3. The protective guard of claim 1 which also comprises an elastic material encasing at least the portion of each of said cables extending beyond said housing and likely to come in contact with the steering column so as to prevent the cables from marring or scratching the exterior surface of the steering column.

4. The protective guard of claim 1 wherein said cup-shaped member and each of said cables is of stainless steel.

5. The protective guard of claim 1 which also comprises a backing plate received in said cup-shaped member and constructed and arranged to reinforce said end wall, and wherein said ring retains said backing plate within said cup-shaped member.

6. The protective guard of claim 5 wherein said cup shaped member and each of said loops of cable is of stainless steel and said ring and said backing plate are each of mild steel.

7. The protective guard of claim 1 wherein said ring is press fit into said cup shaped housing member.

8. The protective guard of claim 1 wherein said ring is welded to said side wall of said cup shaped housing member.

9. The protective guard of claim 1 wherein said cup shaped member and each of said loops of cable is of stainless steel and said ring is of mild steel.

10. The protective guard of claim 1 which also comprises an elastic material encasing at least the portion of each of said cables extending beyond said housing and likely to come in contact with the steering column and said cables and elastic material are constructed and arranged such that when bearing on the steering column there is a slight clearance between the steering column and the cup shaped member so as to prevent both the cup shaped member and the cables from marring or scratching the exterior surface of the steering column.

11. A protective guard for an ignition switch on a steering column of a motor vehicle comprising, a metallic housing having an end wall and a side wall constructed and arranged to overlie and surround the ignition switch when the protective guard is mounted on the steering column, a metallic ring received within said housing and constructed and arranged to bear on and reinforce said side wall of said housing, connector means carried by said housing, and at least one elongate flexible metallic strap having one end thereof received within said housing and secured within said housing to said ring, and having an eye adjacent an end thereof distal from said one end for receiving the shackle of a padlock therethrough, said flexible strap being constructed and arranged to extend around the steering column closely adjacent thereto when said housing overlies and encircles the ignition switch and to cooperate with said connector means and the padlock to receive the shackle of the padlock through said eye of said strap such that when the padlock is locked the protective guard prevents unauthorized access to the ignition switch.

12. The protective guard of claim 11 which also comprises a backing plate received within said housing and constructed and arranged to reinforce said end wall of said housing, and wherein said ring retains said backing plate within said housing.

13. A protective guard for an ignition switch on the steering column of a motor vehicle comprising, a metallic housing having an end wall and a side wall constructed and arranged to overlie and surround the ignition switch when the protective guard is mounted on the steering column, a metallic ring received in said housing and constructed and arranged to reinforce said side wall of said housing, and first and second flexible metallic elongate straps each extending into said housing with one end of each of said flexible straps being secured within said housing to said ring, and each having an eye adjacent the other end thereof for receiving the shackle of a padlock therethrough, said flexible straps being constructed and arranged to extend in generally opposite directions around the steering column closely adjacent thereto when said housing overlies and encircles the ignition switch and to receive the shackle of a padlock through said eyes of said straps such that when the padlock is locked the protective guard prevents unauthorized access to the ignition switch.

14. The protective guard of claim 13 which also comprises a backing plate received within said housing and constructed and arranged to reinforce said end wall of said housing, and wherein said ring retains said backing plate within said housing.

15. The protective guard of claim 13 wherein each of said flexible straps comprises a loop of a metallic cable having both of its ends received within said housing and secured within said housing to said ring, and its bite constructed and arranged to provide an eye for receiving the shackle of a padlock.

16. The protective guard of claim 15 which also comprises a metallic backing plate received in said housing and constructed and arranged to reinforce said end wall of said housing, and wherein said ring retains said backing plate within said housing.

17. The protective guard of claim 15 wherein said housing and each of said loops of cable is of stainless steel and said ring is of mild steel.

18. The protective guard of claim 15 which also comprises an elastic material encasing at least the portion of each of said cables extending beyond said housing and likely to come in contact with the steering column, and said cables and elastic material are constructed and arranged such that when bearing on the steering column there is a slight clearance between the steering column and the housing so as to prevent both the housing and the cables from marring or scratching the exterior surface of the steering column.

* * * * *

UNITED STATES PATENT AND TRADEMARK OFFICE
CERTIFICATE OF CORRECTION

PATENT NO. : 4,118,961
DATED : October 10, 1978
INVENTOR(S) : James D. Lee

It is certified that error appears in the above-identified patent and that said Letters Patent are hereby corrected as shown below:

In Column 1, Line 27, change "May 31, 1974"

to -- May 21, 1974 --.

Signed and Sealed this

Twenty-seventh Day of March 1979

[SEAL]

Attest:

RUTH C. MASON
Attesting Officer

DONALD W. BANNER
Commissioner of Patents and Trademarks